(12) United States Patent
Hellwig et al.

(10) Patent No.: US 8,442,054 B2
(45) Date of Patent: *May 14, 2013

(54) METHOD AND CORE NETWORK NODE FOR ESTABLISHING A CONNECTION THROUGH A CORE NETWORK

(75) Inventors: Karl Hellwig, Wonfurt (DE); Juan Noguera, Albacete (ES); Alain Guy Maupin, Stockholm (SE); Martin Israelsson, Spånga (SE); Phil Hodges, Melbourne (AU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 381 days.

This patent is subject to a terminal disclaimer.

(21) Appl. No.: 12/847,445

(22) Filed: Jul. 30, 2010

(65) Prior Publication Data

US 2011/0019675 A1    Jan. 27, 2011

Related U.S. Application Data

(63) Continuation of application No. 10/276,845, filed as application No. PCT/EP01/05773 on May 21, 2001, now Pat. No. 7,792,119.

(30) Foreign Application Priority Data

May 22, 2000    (EP) .................................. 00110820
Aug. 24, 2000   (EP) .................................. 00118438

(51) Int. Cl.
  *H04L 12/28*    (2006.01)
  *H04L 12/56*    (2006.01)
  *G06F 15/177*   (2006.01)

(52) U.S. Cl.
  USPC ............. 370/395.2; 370/395.5; 370/401; 709/222

(58) Field of Classification Search .......... 370/254, 370/395.2, 395.5, 400–401; 709/220–222, 709/227–228
See application file for complete search history.

(56) References Cited

U.S. PATENT DOCUMENTS

| | | | | |
|---|---|---|---|---|
| 6,108,304 A | * | 8/2000 | Abe et al. | 370/232 |
| 6,792,278 B1 | * | 9/2004 | Ahmavaara et al. | 455/461 |
| 6,795,437 B1 | * | 9/2004 | Rasanen et al. | 370/395.1 |
| 7,180,860 B2 | * | 2/2007 | Fonden et al. | 370/235 |
| 7,460,862 B2 | * | 12/2008 | Pasanen et al. | 455/418 |
| 7,792,119 B2 | * | 9/2010 | Hellwig et al. | 370/395.2 |

OTHER PUBLICATIONS

U.S. Appl. No. 10/276,845, filed May 27, 2004.

* cited by examiner

*Primary Examiner* — Tri H Phan

(57) ABSTRACT

A method and core network node for establishing a connection between a first access node and a second access node. The first access node sends to a first core network node, a connection establishment request that includes a set of framing protocol parameters for the framing of information to be sent over an interface between the first access node and the first core network node. The first core network node stores the parameter set and initializes a connection to a further core network node according to the framing protocol. If the further core network node is not connectable to the second access node, connections are successively made to additional core network nodes until reaching a final core network node connectable to the second access node. The final core network node initializes the connection to the second access node, which stores the parameter set. The connection is then established between the first access node and the second access node utilizing the parameter set.

19 Claims, 4 Drawing Sheets

METHOD AND CORE NETWORK NODE FOR ESTABLISHING A CONNECTION THROUGH A CORE NETWORK

RELATED APPLICATIONS

This application is a continuation of U.S. patent application Ser. No. 10/276,845 filed Jul. 1, 2003, now U.S. Pat. No. 7,792,119 which was a filing under 37 C.F.R. 371 of International Application No. PCT/EP01/05773 filed May 21, 2001, which claimed priority on European Patent Application No. 00118438.1 filed Aug. 24, 2000 and on European Patent Application No. 00110820.8 filed May 22, 2000, the disclosures of which are fully incorporated herein by reference.

TECHNICAL FIELD OF THE INVENTION

The present invention relates to a method for establishing a connection between a first node (RNC1) and a second node (RNC2) within a telecommunication network.

BACKGROUND

Communication networks can be subdivided into core networks and access networks, the latter providing access to user equipment, for example a wireless access for mobile user equipment to a radio access network. Core networks interconnect access networks and optionally further networks, e.g. the Internet. In the UMTS architecture, an access network can be controlled by an RNC (radio network controller) which is connected to the core network and provides access to the core network, i.e. serves as access node. In 3GPP ($3^{rd}$ Generation Partnership Project) Technical Specification 3G TS 25.415 V3.2.0, the interface between the access node and a node in the core network is denoted as Iu interface. Over the Iu interface, connections can be established according to the Iu user plane protocol.

RFCIs (radio access bearer subflow combination indicators) are indicators to sets of parameters which are generated by an RNC in radio access bearer (RAB) assignments. They indicate which service data unit formats are valid, for example for use in speech frames or in rate control requests received from the core network, and how they are formatted. RFCIs determine the codec mode, especially allowed rates. When a transcoder is inserted into a connection, it receives data frames, e.g. Iu frames, and relates the assigned RFCI to a codec mode in order to decode the frames. In the same way, it must indicate the RFCI when it sends an encoded frame.

The Iu interface as specified in 3GPP Technical Specification 3G TS 25.415 terminates in a core network node, for example in an MSC or in a media gateway controlled by an MSC server, according to the architecture of the core network. In a core network node, the content of data sent over a connection can be changed. Especially, the payload or speech coding can be adapted, for example due to the intervention of supplementary services like DTMF (Dual Tone Multifrequency) tone insertion, supplementary services tone insertion, messages or conference connections of user equipment.

For connections between nodes within the core network, different protocols are possible. Beside the Iu user plane protocol, 1.366.2 is a protocol defined by the ITU (International Telecommunication Union) as service specific convergence sublayer (SSCS) used on AAL2 (Asynchronous Transfer Mode Adaptation Layer Type 2) for carrying service specific payloads. Especially, it is the framing protocol proposed to be used for carrying compressed voice. This requires the core network node to terminate the Iu interface and to establish an AAL2 connection with the required SSCS for the selected speech coding type. A further framing protocol is RTP (Real Time Protocol) which can be carried on an IP transport layer in the core network for transmission of compressed voice of a specified encoding.

A problem with both RTP and 1.366.2 is that they are application dependent and transport layer dependant. If the coding type changes during a connection, a new AAL2 connection or modification must be made with the new SSCS profile. For an IP network, a new RTP profile must be used. This requires unnecessary overhead to carry the profiles with the payload. A further problem with SSCS or RTP is that both are service specific. The protocols require modifications in standardization and implementation for every new service.

In contrast to this, the Iu user plane protocol is defined service independent. An Iu interface can be connected between two access nodes, e.g. by using BICC (Bearer Independent Call Control) messages to pass the bearer address used in a first access node from a server, e.g. an MSC, controlling it to the server controlling the other access node. In this case, it is disadvantageous that there is no control of the user plane. For example, when a handover is necessary or a supplementary service invocation occurs, the Iu connection has to be cancelled and a new Iu connection must be established which is very inefficient and would degrade the service level. However, for most of the time in a connection, supplementary services or other functions within the connection path are not necessary and hence a virtually direct and transparent connection between access nodes or an access node and a transcoder is advantageous.

The other described framing protocols do not carry the Iu user plane parameters. Transcoders are necessary to terminate the Iu connection and need to receive the parameters sent by the Iu user plane initialization procedure (RFCIs). If another of the above-described framing protocols is used in the core network, the Iu user plane protocol is terminated at the first core network node in the connection, e.g. a media gateway. The payload content is then mapped to the other framing protocol.

Furthermore, the RFCI initialization must be carried by the other framing protocol and possibly mapped to the actual mode as the framing is codec type specific. At the final core network node in the connection, a transcoder to terminate the Iu connection to the access node must then be initialized and the payload content must be mapped back to the Iu user plane protocol which requires sufficient processing capacity.

It is also conceivable that parameter sets like RFCIs are transferred from access nodes by out-band procedures, i.e. the core network nodes are provided with parameter sets by a vertical control protocol from servers controlling them. This architecture is customary in a telecommunication system with separate user plane comprising the core network nodes and a control plane with the servers. Between the servers, the parameter sets can be transferred via the horizontal bearer independent call control (BICC) protocol. The parameter sets can then be transferred to the core network nodes and stored during connection set-up or are only sent when needed to modify a connection. Although this solution allows establishing an Iu user plane connection transparently through the core network nodes, it has the disadvantage that it requires a high amount of signaling traffic.

In the case, that inband signalling is used, two further problems can occur. Firstly, that parameter sets sent by a first RNC and a second RNC might by crossing. This happens for example, when a second RNC sends a parameter set before it receives a parameter set from the first RNC.

Secondly, an RNC might start initializations without being requested by an MSC, a so-called unsolicited initiation. To recognise said initializations, core network nodes have to monitor the user plane they transport. As this consumes processor capacity in said core network nodes, this is not always favored.

SUMMARY AND DESCRIPTION OF THE INVENTION

It is the object of the present invention to obviate the above disadvantages and provide a simple method for the establishment of an efficient connection through a network, wherein the connection can easily be controlled.

The proposed method establishes a connection between a first access node and a second access node which are connectable over a core network. An access node can also be a node connecting a further communication network to the core network or a core network node terminating the connection in a transcoder. The core network comprises interconnected core network nodes, for example media gateways or customary mobile services switching centers (MSC). The first access node initializes the connection to a first core network node according to a framing protocol. If the access node belongs to a different network, the initialisation can be performed via a core network control node. During the initialization, a set of parameters for the framing of information sent over the interface between the first access node and the first core network node is transmitted to the first core network node. The first core network node stores the parameter set in a memory.

The first core network node either decides or receives a decision from a core network control node or an access node whether an indicator is to be set, that transparent Iu UP transmission is permitted. An indicator is set to "transparent transmission of Iu UP is permitted". This has the effect, that the access nodes are not permitted to perform an unsolicited initialisation and that respectively the core network control nodes or core network nodes can decide to remove the monitoring of Iu UP for initialisation messages. The parameter indicating the setting of the indicator is sent to the access nodes during RAB assignment. The first core network node stores the indicator in its memory.

In the case that the indicator is set, the Iu UP handling in the core network nodes can be switched in or switched out for example by core network control nodes. It is then also required that no unsolicited Iu initialisation is received by the core network nodes. This is acceptable because the core network control node controls the RAB Assignment and the edge core network nodes, for example the first and the final control node. It is the edge core network nodes that need their Iu UP function switched in prior to a RAB assignment modification.

The control of this procedure can be initiated by the core network control nodes at either end of the call, independently. A new procedure in the RAB Assignment from the core network control node to the RNC indicates that the RNC should maintain the Iu UP initialisation until instructed to change by a further RAB Assignment or Relocation Request. The RNC can send the indicator, for example as a new field in the IU UP initialisation PDU. This enables other core network nodes in the call path to remove their Iu UP termination and monitoring functions.

The first core network node then initializes the connection to a further core network node according to said protocol and the further core network node also stores the parameter set and, if applicable, the indicator. In this way, a stepwise initialization of the connection to further core network nodes and storing of parameters and, if applicable, the indicator in the further core network nodes is performed until a final core network node is reached which is connectable to the second access node. It is possible that the second core network node is already the final core network node. The final core network node initializes the connection to the second access node according to said framing protocol and the second access node stores the parameter set and, if applicable, the indicator.

The proposed method is simple and requires a low processing effort in the nodes because no mapping between different framing protocols is necessary. In a simple implementation, the core network nodes transfer the frames without evaluation of the content. However, every core network node can terminate the framing protocol, establish further connections or connections with different parameters and access the data in the frames using the stored parameters. Especially, the connection can be controlled or adapted in every node with low delay and independent of other nodes in the connection. Because only one protocol is used in a connection, there are no problems of adaptation and a fast evolution of services is possible. A virtual transparent connection between access nodes and a transcoder, respectively between access nodes is possible. Preferably, the described method is performed in a communication network.

The proposed method allows, however, also to change the framing protocol between two nodes in the core network (e.g. between CN1 and CN2 by use of RTP or 1.366.2) wherever required and where these other framing protocols are defined for the service in question, because the framing protocol is initialized and can be terminated in each of the nodes. This requires more processing within these network nodes and is not as flexible as the preferred method, but it allows the intervention of supplementary services within each node, as described below.

In a preferred embodiment, the core network nodes acknowledge the initialization to the preceding node, i.e. a core network node or an access node. In this way, the initialization is terminated for the preceding node. The acknowledgement is preferably sent before or during the initialization of the connection to a further core network node.

A preferable framing protocol is the Iu protocol which can be used inside a core network according to 3GPP specifications to carry payload between core network nodes and to an edge of the network where, for example, the connection is terminated in a transcoder or in a terminating access node, e.g. an RNC. The Iu user plane protocol is initialized in every node in the connection that may add a service to the payload.

An advantageous core network node in the connection can insert a function unit into the connection, e.g. break the transcoder free operation of the connection by inserting a transcoder or by inserting a function unit providing a supplementary service. An insertion of supplementary services can occur inside media gateways without an influence on other nodes and links in the connection and is in this way fast and simple to handle.

A preferable core network node can break the connection and initialize a connection segment to a different core network node or access node according to said protocol, preferably using the same parameter set for the connection segment as for the former connection. In this way, for example a handover of a connection between different access nodes can be performed if the connection is terminated by a mobile user equipment moving in a communication system or the connection can be redirected.

The second access node can initialize a reverse connection to the final core network node according to the protocol. A second set of parameters for the framing of information is transmitted, and the initialization is performed stepwise to the first access node, i.e. in the same way as the first connection. It is preferable that both sets of parameters are identical or at least enable a connection according to a common subset of parameters.

It is possible that both access nodes receive a request from control nodes of the core network to establish a connection to the respective other access node. Especially in this case, both sets of parameters can be incompatible, i.e. no common connection parameters can be obtained from the sets although both sets may allow several different connection options. In this case, the processing system of a preferable core network node checks both sets of parameters and inserts a transcoder into the connection which adapts the formats of the frames sent according to the different parameter sets.

Alternatively, if a core network node detects that both sets of parameters are incompatible, it sends a message to a control server for initiating a modification of connection parameters by at least one access node. The modification can be initiated by control messages sent to the respective access node.

The connection between two core network nodes can be established via one or several switches, i.e. nodes in the core network which do not store connection parameters and can not change connection parameters.

If a core network node is adapted to establish connections according to different framing protocols, it preferably checks the framing protocol defined in a request to initialize a connection and selects said framing protocol for the initialization of the connection to a further node. In this way, a mapping between different protocols is avoided while several protocols can be used.

A core network node according to the invention, e.g. an MSC or a media gateway, is interconnected with further core network nodes. It has an interface for receiving an initialization request from an access node or a further core network node to establish a connection according to a framing protocol. A processing system is adapted to extract a set of parameters for the framing protocol from the request and initialize the connection to a further core network node or an access node according to said protocol. Optionally, the processing system determines an indicator for the permission of transparent Iu UP transmission after connection establishment. The determination can be performed by extracting the indicator from the initialisation request, by receiving it from a core network control node, or by decision. The extracted parameter set and, if applicable, the indicator are stored in a memory. The indicator is evaluated for the monitoring of the payload. The core network node can preferably perform any steps of the above described methods relating to the core network node.

In the invention, a transparent transmission through core network nodes is preferably selected. In a non-transparent mode, a core network node transmitting the user plane monitors the user plane for initialisation messages.

In the transparent mode, unsolicited Iu UP (Iu user plane) initialization, that is an Iu UP initialization starting without involving an MSC or MSC server, from an RNC during an active call is not permitted. The RAB (radio access bearer) assignment contains a new parameter which indicates if the RNC is allowed to perform unsolicited Iu UP initializations or not. If the MSC Server has successfully negotiated a TrFO (transcoder free operation) call it can then decide if it wants the TrFO connection to be transparent or not. If the option is to support transparent Iu UP connections then it sets this parameter in the RAB Assignment. The RNC then sets the new indicator in the Iu UP initialization indicating this. This means that the RNC does not re-configure its set of parameter e.g. RFC's and TFC's mid-call without receiving a new RAB Assignment or Relocation Request from the MSC.

In the case where an SRNC (serving RNC) receives an Iu frame indicating that an initialization procedure is active at the other end of the Iu UP, the RNC changes its RFCI set to match the set indicated by the peer. That is, both RFCI sets, i.e. the set for uplink and the set for downlink, match and are derived by the peer.

If the transparent mode is not supported by a core network node, the user plane has to be monitored for Iu UP initialization and mapping of RFCI allocation from the RNC interacting with said core network node, to any initializations received from a far end RNC is to be performed.

A program unit according to the invention can be stored on a data carrier or be directly loadable into a core network node. The program unit comprises code for performing the steps of receiving a request to initialize a connection according to a framing protocol, extracting a set of parameters for the framing of information according to said protocol, storing the parameter set. Optional is a step of deciding or receiving a decision whether an indicator for the permission of transparent transmission of Iu UP is permitted. Furthermore, the unit performs the step of initializing the connection to a further core network node or an access node according to said protocol, and, if applicable, forwarding the indicator. It can preferably perform any steps of the above methods relating to the core network node.

The foregoing and other objects, features and advantages of the present invention will become more apparent in the following detailed description of preferred embodiments as illustrated in the accompanying drawings.

DETAILED DESCRIPTION OF PREFERRED EMBODIMENTS OF THE INVENTION

Figure 1:
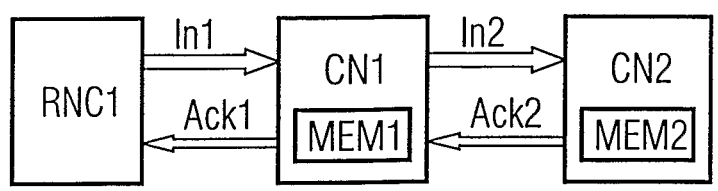
FIG. 1 shows a basic connection establishment according to the invention.

In FIG. 1 the first steps of the initialization of a connection according to the invention is depicted. The connection is established according to the Iu user plane protocol, which is terminated in every core network node CN that may require modifying the user connection, for example for a supplementary service intervention. From a first access node RNC1 a message In1 to initialize a connection is sent to a first core network node CN1. In the example, the message In1 is an Iu initialize packet data unit. A processing system of the first core network node CN1 extracts a set of parameters, especially RFCIs, from the message In1 and stores them in a memory MEM1. The first core network node CN1 sends an acknowledgement Ack1 of the message In1 to the first access node RNC1 and creates a further message In2 comprising the parameter set. The core network node CN1 can decide to allow transparent Iu UP transmission after call establishment. In this case, an indicator indicating the transparent transmission of Iu UP is added to the parameter set or sent together with it. This can be implemented by a modification of the 3GPP TS 25.415 standard, allowing the addition of said indicator. Message In2 is sent to a further core network node CN2 which also extracts the parameter set and said indicator, stores it in a memory MEM2 and sends an acknowledgement Ack2 back to the first core network node. By repeating the initialization stepwise for all nodes in the connection, every node has control of the Iu user plane and service data unit formats passed in the initialization packet data unit.

Figure 2:
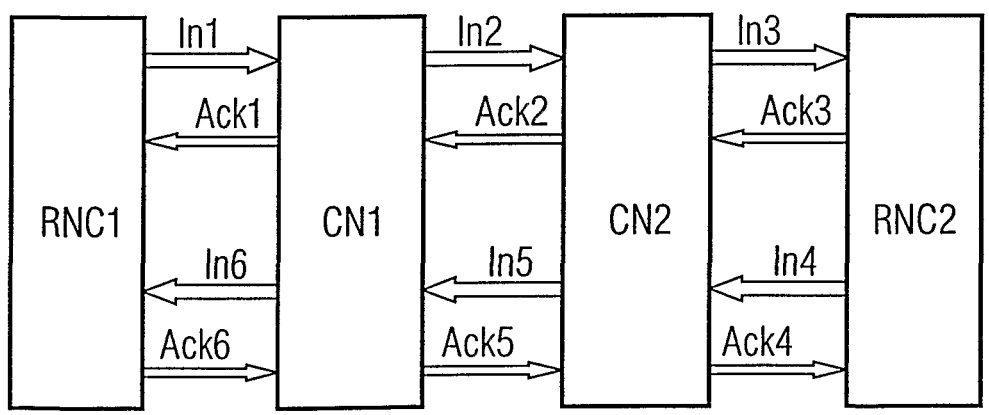
FIG. 2 shows a connection establishment between two access nodes.

Parameter sets, especially RFCIs, are generated according to customary specifications for communication networks by the access nodes RNC1, RNC2 as soon as a request to set up a connection is received. For a transcoder free operation of a connection, there are generally two sets or RFCIs, being initialized from each access node to the other. Alternatively, the messaging from and between servers controlling the core network nodes CN can be adapted to allow only one initialization, e.g. from the first access node RNC1. As shown in FIG. 2, the second access node RNC2 waits in this case for the initialization from the first access node RNC1 sent stepwise via messages In1, In2, In3 acknowledged by corresponding acknowledgements Ack1, Ack2, Ack3. In the same way, the connection is then initialized backwards with the same set of parameters via messages In4, In5, In6 acknowledged by corresponding acknowledgements Ack4, Ack5, Ack6. In this way, incompatible parameter sets can be avoided.

In a preferred embodiment of the invention, no initialization in backward direction is performed if the indicator for a transparent Iu UP transmission is set. As the same parameter set is used in either direction, an initialization in backward direction is redundant. To enable the usage of the same parameter set in uplink and downlink between the final core network node CN2 and the second access node RNC2, the second access network node has to adapt both parameter sets, for uplink and downlink connection at initialization.

Figure 3:
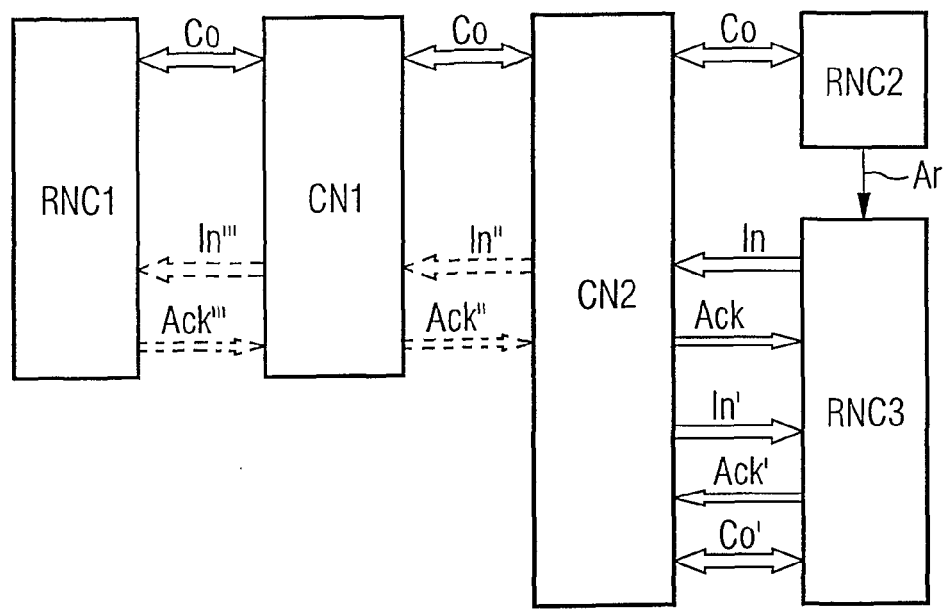
FIG. 3 shows a redirection of a connection between two access nodes.

FIG. 3 shows an example of a redirection of an established connection Co due to a relocation of the serving access node terminating one end of the connection Co as indicated by arrow Ar. A relocation can for example be necessary when a user moves in the coverage area of a mobile communications network and a handover is performed between radio base stations controlled by different controllers serving also as access nodes RNC2, RNC3. A new radio access bearer is established by access node RNC3 to the core network node CN2, e.g. a media gateway, by performing a new Iu user plane initialization with a message In which is acknowledged by acknowledgement Ack the core network node CN2. The parameters initialized by the first access node RNC1 for the original connection are read from a memory in core network node CN2 and transmitted in initialization message In' with corresponding acknowledgement Ack' to the new access node RNC3. The new access node RNC3 can use the set of parameters for both uplink and downlink connection to the network. The other nodes taking part in the connection are left unaffected. In this way, a new connection segment Co' can be established in a fast and simple way.

In an embodiment, the core network node CN2 transfers the parameters from message In by stepwise initialization back to the other access node RNC1 as depicted by initialization messages In'', In''' with corresponding acknowledgements Ack'', Ack'''. Preferably, message In'' is only sent if the core network node CN2 detects that the parameter set in message In is compatible to those of the original connection Co. Else procedures as described with respect to FIGS. 4 and 5 can be initiated.

Figure 4:
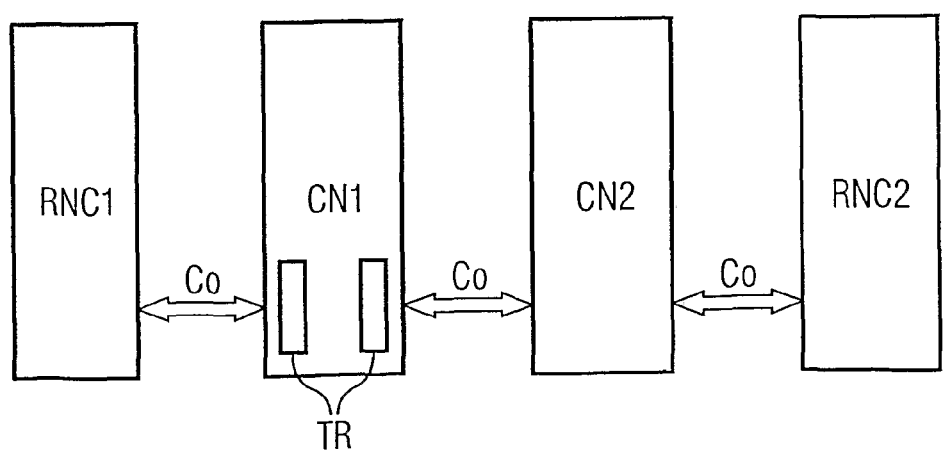
FIG. 4 shows a connection with an inserted pair of transcoders.

In FIG. 4, a connection Co between two access nodes RNC1, RNC2 over core network nodes CN1, CN2 is shown with a pair of transcoders TR inserted into the connection. The insertion can be performed at any core network node. The insertion can be performed for example into an ongoing connection to provide a supplementary service or already during the establishment of connection, Co if required by incompatible parameter sets sent by the access nodes RNC1, RNC2. Preferably, the insertion of a transcoder TR is handled within a core network node CN1. Because the necessary parameters for terminating the Iu user plane protocol are stored in the core network node CN1, they can be provided to the transcoder TR fast and efficiently. Therefore, transcoder TR can be switched into connection Co with minimum delay in a primed state. Consequently, speech and data frames can be received and transmitted coherently during the insertion improving the in this period connection quality.

Figure 5:
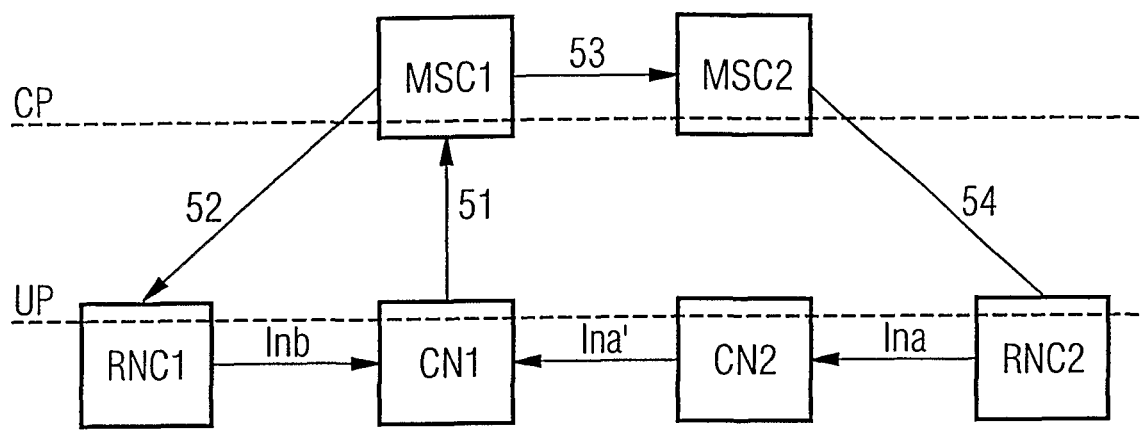
FIG. 5 shows the processing of a connection which is initiated with incompatible parameter sets by the access nodes.

In FIG. 5, the treatment of a mismatch of parameter sets in a communication system with separate user plane UP and control plane CP is described. The user plane UP comprises the core network nodes CN1, CN2 and the access nodes RNC1, RNC2 while several servers MSC1, MSC2 for controlling these nodes CN, RNC are included in the control plane CP. Messages within the control plane CP can for example be transferred according to the BICC protocol, while the Iu user plane protocol is suitable for messages within the user plane UP.

In the example both access nodes RNC1, RNC2 have received from the respective servers MSC1, MSC2 a message to initiate a connection with a specific codec type. Accordingly, access node RNC1 begins to initialize a connection with a message Inb while access node RNC2 begins to initialize a connection with messages Ina, Ina'. The corresponding acknowledgements are not shown to simplify the figure. It is possible, that the access nodes RNC1, RNC2 select different active codec sets for the initialization messages Ina, Inb which are incompatible.

Preferably, every core network node or specified core network nodes in the connection, e.g. media gateways connected to access nodes, compare the parameter sets received in the different initialization messages Ina', Inb. If a core network node CN1 determines that there is no match of supported modes—i.e. both access nodes RNC initialize separate modes without a common mode—the core network node CN1 in one embodiment of the invention automatically inserts transcoders to allow the successful establishment of the connection. In this case, the transcoders in the core network node CN1 terminate two connections to the respective access nodes RNC1, RNC2. The initialization of the reverse connections is then started from core network node CN1 with an initialization messages containing the parameter set of message Inb towards access node RNC1 and with an initialization messages containing the parameter set of message Ina' towards access node RNC2.

The alternative embodiment depicted in FIG. 5 allows to establish a transparent connection without transcoders if a common mode is possible for both access nodes RNC. In this case, core network node CN1 sends a message 51 to the controlling server MSC1, that the RFCI sets received in both messages Inb, Ina' are incompatible. Message 51 can for example be sent over an H.248 interface. Due to stored or requested capability information about the access nodes, the server MSC1 can then decide whether it is necessary to modify the connection by sending back a message to the core network node CN1 to insert transcoders.

If, however, both access nodes RNC1, RNC2 are adapted to establish a connection with a common mode, messages 53 for determining a corresponding mode can be sent to the servers controlling the access nodes RNC1, RNC2. The servers MSC1, MSC2 can then send messages 52, 54 to the respective access nodes RNC1, RNC2 to activate said mode and repeat the initialization with new messages Ina, Inb. Messages 52, 54 can for example be RANAP (Radio Access Network Application Protocol) messages.

If different framing protocols are supported in the core network it is proposed that they are also negotiated in the control plane CP along with the codec types and bearer connection characteristics. In this case, one framing protocol, e.g. Iu user plane, can be requested as the preferred framing type, especially from a 3G access node. This provides the opportunity to use Iu user plane framing end to end if a connection transits a network supporting different framing protocols and then again terminates in a 3G network. Compressed speech can then be conveyed through the core network without mapping between different framing protocols. Further, any services can be supported in every core network node after it has terminated the Iu user plane protocol. It can then insert a transcoder without requiring a new User Plane initialization or radio access bearer re-establishment.

Finally, if multiple framing protocols are used in a connection, the stepwise initialization of the RFCIs can also be adopted for these protocols.

Figure 6:
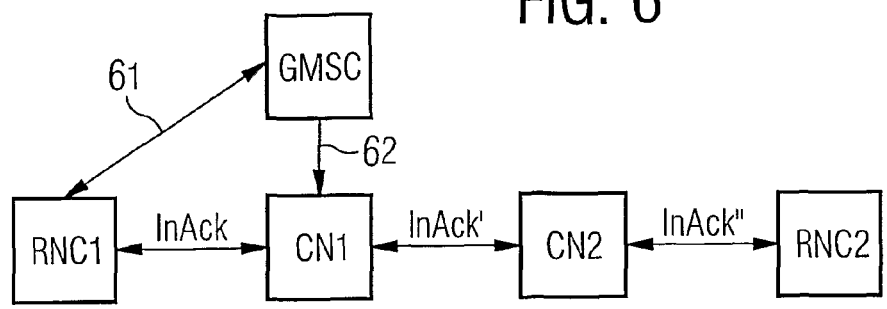
FIG. 6 shows a basic connection establishment according to the invention.

In FIG. 6 a connection is set up between an access node from a further network and a network controlled according to the invention. A call request 61 is received in a core network control node GMSC. The core network control node GMSC decides to set an indicator that the transparent Iu UP transmission is permitted. It defines a set of parameter and sends the set of parameter, or an identification of said set as well as the indicator to a first core network node CN1 in a message 62.

In a further embodiment of the invention, the set of parameters and an acknowledgement are exchanged in a message sequence InAck between the access node RNC1 and the first core network node CN1. In this case, only the decision to set the indicator is sent by the core network control node GMSC to the core network node.

In another embodiment of the invention, also the decision to set an indicator is taken by an access node, or the parameter indicating said decision is sent by the core network control node GMSC to an access node. In those cases message 62 is not sent.

Independent from the source of the set of parameters or indicator, after the reception of said parameter set and the indicator, the first core network node CN1 continues the connection establishment as described in FIG. 1. The initialization message and the according acknowledgement are depicted as the message sequences InAck' and InAck".

Figure 7A:
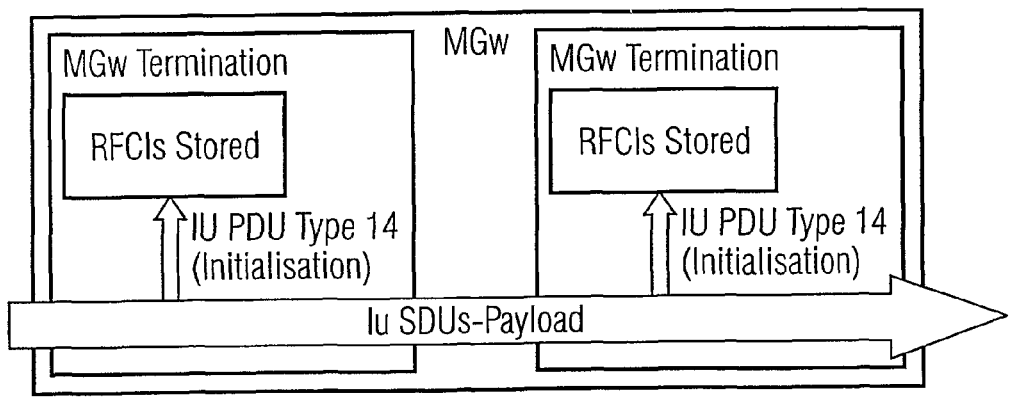
FIG. 7a shows a core network node transferring Iu UP in a non-transparent way.
Figure 7B:
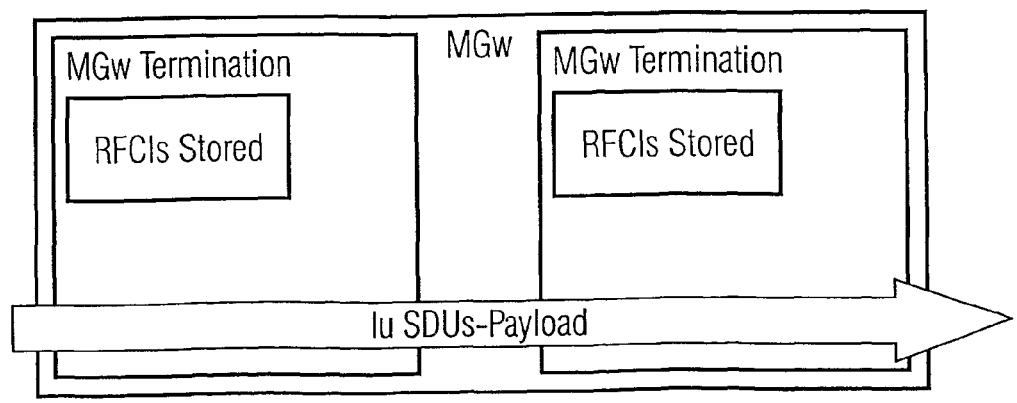
FIG. 7b shows a core network node transferring Iu UP in a transparent way.

The difference between the non-transparent and the transparent transmission of Iu UP is described in FIGS. 7*a* and 7*b* using an Iu UP protocol as an example.

FIG. 7*a* shows two core network nodes, monitoring the Iu UP here referred to as lu SDUs-payload for initialization messages referred as IU PDU Type 14 while transferring it. In both nodes, the currently valid RFCIs are stored.

FIG. 7*b* shows the same core network nodes transferring Iu UP transparently. The payload is not monitored, RFCIs are stored. In that case, the stored RFCI values will be used for the new connection segment. As the core network nodes do not monitor the Iu UP for initialization messages, no unsolicited initialization must be sent to them.

The above embodiments admirably achieve the objects of the invention. However, it will be appreciated that departures can be made by those skilled in the art without departing from the scope of the invention which is limited only by the claims.

The invention claimed is:

1. A method of establishing a connection between a first access node and a second access node, the access nodes being connectable to a core network, wherein the core network comprises interconnected core network nodes, said method comprising the steps of:
    sending by the first access node to a first core network node, a connection establishment request for a connection to the first core network node according to a framing protocol, wherein the request includes a set of parameters for the framing of information to be sent over an interface between the first access node and the first core network node;
    storing the parameter set by the first core network node;
    initializing by the first core network node, a connection to a further core network node according to the framing protocol;
    storing the parameter set by the further core network node;
    if the further core network node is not connectable to the second access node, successively initializing the connection to additional core network nodes and storing the parameters in the additional core network nodes until a final core network node is reached which is connectable to the second access node;
    initializing by the final core network node, the connection to the second access node according to the framing protocol;
    storing the parameter set by the second access node; and
    establishing the connection between the first access node and the second access node utilizing the parameter set.

2. The method according to claim 1, wherein one of the core network nodes in the connection breaks the connection and initializes a connection segment to a different core network node or access node according to the framing protocol.

3. The method according to claim 1, further comprising deciding to set an indicator that transparent transmission is to be performed after call establishment, wherein the indicator is sent with the parameter set to each of the core network nodes and to the second access node.

4. The method according to claim 3, wherein the deciding step is performed by a core network control node controlling the first core network node.

5. The method according to claim 3, wherein the deciding step is performed by the first core network node.

6. The method according to claim 3, wherein the deciding step is performed by the first access node.

7. The method according to claim 3, further comprising after call establishment, transparently transmitting data between the first access node and the second access node.

8. The method according to claim 1, wherein the set of parameters includes radio access bearer subflow combination indicators (RFCIs) indicating a codec mode for the connection.

9. A method of establishing a connection according to a framing protocol between a first access node and a second access node via a core network, wherein the core network comprises two or more interconnected core network nodes including a first core network node and a final core network node, and wherein transparent transmission will be performed after call establishment, the method comprising the steps of:

receiving by the first core network node, a set of parameters for framing information sent over an interface between the first access node and the first core network node;

storing the set of parameters by the first core network node;

initializing by the first core network node, a connection to a further core network node according to the framing protocol, wherein an indicator that transparent transmission is to be performed after call establishment is sent to the further core network node;

storing by the further core network node, the set of parameters and the indicator;

if the further core network node is not connectable to the second access node, successively initializing the connection to additional core network nodes and storing the parameters and the indicator in the additional core network nodes until a final core network node is reached which is connectable to the second access node;

initializing by the final core network node, the connection to the second access node according to the framing protocol;

storing by the second access node, the parameter set and the indicator; and after call establishment, transparently transmitting data between the first access node and the second access node.

10. The method according to claim 9, further comprising the steps of:

setting by a core network control node, a parameter indicating that unsolicited Iu initializations are not permitted; and sending the parameter to an access node.

11. The method according to claim 9, further comprising initializing by the second access node, a reverse connection to the final core network node according to the framing protocol, wherein the second access node sends a second set of parameters for the framing of information to the final core network node.

12. The method according to claim 11, wherein the sets of parameters differ and a core network node inserts a pair of transcoders into the connection.

13. The method according to claim 9, wherein the set of parameters includes radio access bearer subflow combination indicators (RFCIs) indicating a codec mode for the connection.

14. A core network node in a communication network having a plurality of interconnected core network nodes, the core network node comprising:

a first interface for receiving an initialization request from a first access node or another core network node to establish a connection according to a framing protocol;

a processing system for extracting a set of parameters for the framing protocol from the request;

a memory for storing the extracted set of parameters; and a second interface for initializing the connection to a further core network node or to a second access node according to the protocol, wherein the interface sends the set of parameters to the further core network node or to the second access node.

15. The core network node according to claim 14, wherein the set of parameters includes a parameter indicating a codec mode for the connection.

16. The core network node according to claim 14, wherein the set of parameters includes radio access bearer subflow combination indicators (RFCIs) indicating a codec mode for the connection.

17. A core network node in a communication network having a plurality of interconnected core network nodes, the core network node comprising:

a first interface for receiving an initialization request from a node to establish a connection according to a framing protocol;

a processing system for extracting a set of parameters for the framing protocol from the request and for determining an indicator for permitting transparent Iu User Plane (UP) transmission after connection establishment;

a memory for storing the extracted set of parameters and the indicator; and a second interface for initializing the connection to a further node according to the protocol and for monitoring the transparent Iu UP transmission according to the indicator.

18. The core network node according to claim 17, wherein the set of parameters includes a parameter indicating a codec mode for the connection.

19. The core network node according to claim 17, wherein the set of parameters includes radio access bearer subflow combination indicators (RFCIs) indicating a codec mode for the connection.

* * * * *